United States Patent
Koga (10) Patent No.: US 7,403,656 B2
(45) Date of Patent: Jul. 22, 2008

(54) METHOD AND APPARATUS FOR RECOGNITION OF CHARACTER STRING IN SCENE IMAGE

(75) Inventor: Masashi Koga, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 470 days.

(21) Appl. No.: 11/048,650

(22) Filed: Feb. 4, 2005

(65) Prior Publication Data
US 2006/0039605 A1    Feb. 23, 2006

(30) Foreign Application Priority Data
Aug. 20, 2004    (JP) ............................. 2004-240244

(51) Int. Cl.
*G06K 9/34* (2006.01)
*G06K 9/72* (2006.01)

(52) U.S. Cl. ...................... 382/177; 382/229

(58) Field of Classification Search ......... 382/173–216, 382/229–231
See application file for complete search history.

(56) References Cited

U.S. PATENT DOCUMENTS

| | | | |
|---|---|---|---|
| 5,367,578 A * | 11/1994 | Golem et al. | 382/183 |
| 5,600,736 A * | 2/1997 | Hagita | 382/209 |
| 5,949,913 A * | 9/1999 | Shimazu et al. | 382/254 |
| 6,327,382 B1 * | 12/2001 | Kaneda et al. | 382/164 |
| 7,164,795 B2 * | 1/2007 | Ohara et al. | 382/199 |
| 7,170,647 B2 * | 1/2007 | Kanatsu | 358/453 |
| 7,277,584 B2 * | 10/2007 | Nakanishi et al. | 382/218 |
| 2002/0015167 A1 * | 2/2002 | Watanabe et al. | 358/1.11 |
| 2002/0021840 A1 * | 2/2002 | Ohara et al. | 382/199 |
| 2003/0012440 A1 * | 1/2003 | Nakanishi et al. | 382/181 |
| 2004/0146200 A1 * | 7/2004 | Andel et al. | 382/177 |
| 2005/0031208 A1 * | 2/2005 | Ohara et al. | 382/202 |
| 2005/0180632 A1 * | 8/2005 | Aradhye et al. | 382/182 |
| 2007/0211942 A1 * | 9/2007 | Curtis et al. | 382/181 |
| 2008/0008383 A1 * | 1/2008 | Andel et qal. | 382/173 |

OTHER PUBLICATIONS

Location and Recovery of Text on Oriented Surfaces P. Clark and M. Mirmehdi WW.cs.bris.ac.uk.

* cited by examiner

*Primary Examiner*—Aaron W Carter
(74) *Attorney, Agent, or Firm*—Antonelli, Terry, Stout & Kraus, LLP.

(57) ABSTRACT

A character recognition method that is robust under an unknown illumination condition is provided. An apparatus for realizing such robust character recognition includes plural different binarization, means for synthesizing character sub-image candidates that have been obtained from the binarization units, and means for analyzing character sub-image candidates and for recognizing an image as a character string consisting of character sub-image candidates.

1 Claim, 9 Drawing Sheets

FIG. 11

METHOD AND APPARATUS FOR RECOGNITION OF CHARACTER STRING IN SCENE IMAGE

CLAIM OF PRIORITY

The present application claims priority from Japanese application JP 2004-240244, filed on Aug. 20, 2004; the content of which is hereby incorporated by reference into this application.

FIELD OF THE INVENTION

The present invention relates in general to a field of technology involving the recognition of characters in a scene image, and, more particularly, the invention relates to the technical fields of image processing, pattern recognition, language processing, etc. Moreover, the present invention relates to a field of technology that may be suitably applied to input means in a portable device having a camera incorporated therein.

BACKGROUND OF THE INVENTION

Conventionally, there are many known techniques for converting a document into electronic image data using a scanner and for subsequently recognizing characters in the data. In the implementation of these conventional techniques, it is often the case that the characters are black and the background is white. Moreover, because a scanner is used, the illumination is bright and does not have an unevenness, and, hence, a high-definition image can be obtained. Consequently, pixels constituting characters are likely to be dark, pixels constituting the background are likely to be bright, and the characters and the background can be separated by thresholding.

Recently, there is an emerging technology directed to the recognition of recognizing characters on signboards, indicators, etc. in a scene image captured by a digital camera. In this case, however, the illumination condition is unknown, and the colors of the characters and the background are diversified. Therefore, it is not possible to set a threshold for pixel values used for separating the characters and the background in advance, and the threshold may vary depending on the location. For this reason, separation of the characters from the background has been difficult.

For example, in a technique described a paper by Paul Clark and Majid Mirmehdi, entitled "Location and recovery of text on oriented surfaces," in SPIE conference on Document Recognition and Retrieval VII, pp. 267-277, The International Society for Optical Engineering, January 2000, on the assumption that Text Planes such as sheets of paper, signs, etc., on which characters are printed are rectangles, the Text Plane is detected automatically, and characters are detected. In this detection, the illumination on the Text Plane is assumed to be even. However, in actual practice, the real condition is not as set by the assumption, and there are many cases in which this method fails to produce satisfactory results because of illumination unevenness on the Text Plane.

[Non-Patent Document 1]

Paul Clark and Majid Mirmehdi, "Location and recovery of text on oriented surfaces," in SPIE conference on Document Recognition and Retrieval VII, pp. 267-277, The International Society for Optical Engineering, January 2000.

SUMMARY OF THE INVENTION

The problem that this invention intends to solve is to detect and recognize with high accuracy the characters of a scene image taken under an unknown illumination condition.

In order to solve the above-mentioned problem, this invention teaches that an apparatus for the above-described purpose shall have plural binarization means and, thereby, obtain a set of character sub-image candidates. Here, a character pattern represents a set of pixels corresponding to one character. Moreover, a character pattern hypothesis that is appropriate as a character string is selected using a character recognition result. That is, the consistency as a character string is determined. For a measure of the consistency of a character string, linguistic information and the layout of characters (whether all characters are approximately equal in size or whether all characters are aligned in a straight line) are used. Especially, this invention has novelty in expressing a set of character sub-image candidates that have been obtained by different binarization means in a single network. Thereby, it is possible to verify the appropriateness of character patterns as a character string, which has heretofore been difficult conventionally.

DETAILED DESCRIPTION OF THE PREFERRED EMBODIMENTS

Figure 1:
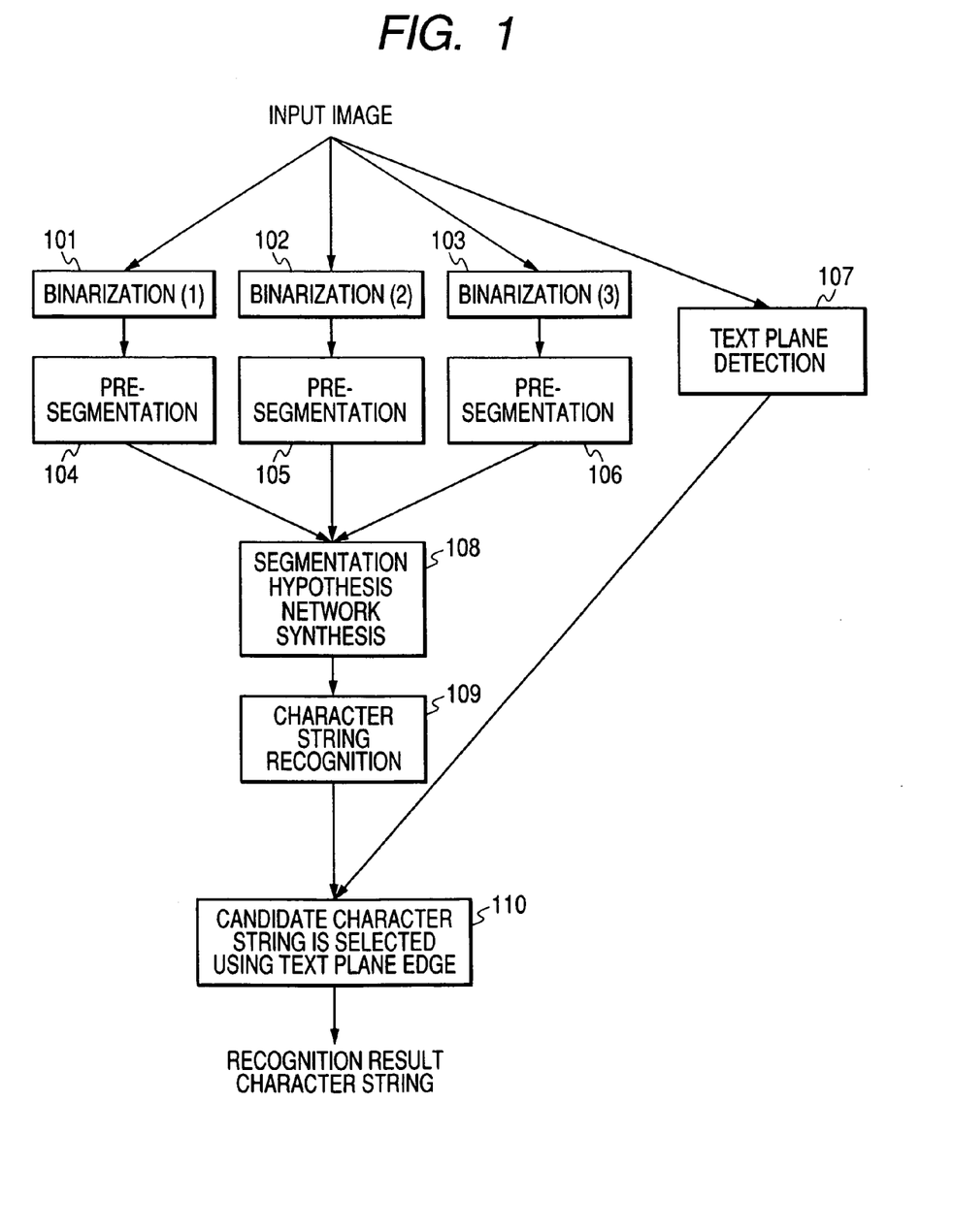
FIG. 1 is a flowchart showing the flow of processing in accordance with the present invention.

A processing procedure in accordance with one embodiment of this invention is shown in FIG. 1. Here, an input image is assumed to be a grayscale image or a color image. A black-and-white (binary) image also may be assumed. First, plural binary images are obtained from the input image by plural different binarization means 101, 102, and 103. There are various methods of obtaining a binary image from a grayscale image or a color image, and the result generally obtained also varies among the methods used. Moreover, there are many methods, each of which yields different results depending on the parameters, even though it is the same method. In this embodiment, plural binarization means that bring about different results shall be used.

Next, pre-segmentation means 104,105, and 106 detect character sub-image candidates from respective binary images that have been obtained. For pre-segmentation, for example, a method as disclosed in a paper by M. Koga and T. Kagehiro, H. Sako and H. Fujisawa, entitled "Segmentation of Japanese Handwritten Characters Using Peripheral Feature Analysis," in Proc. of the 14th Intl. Conf. on Pattern Recognition, pp. 1137-1141, Brisbane, Australia, August 1998, can be used.

Figure 6:
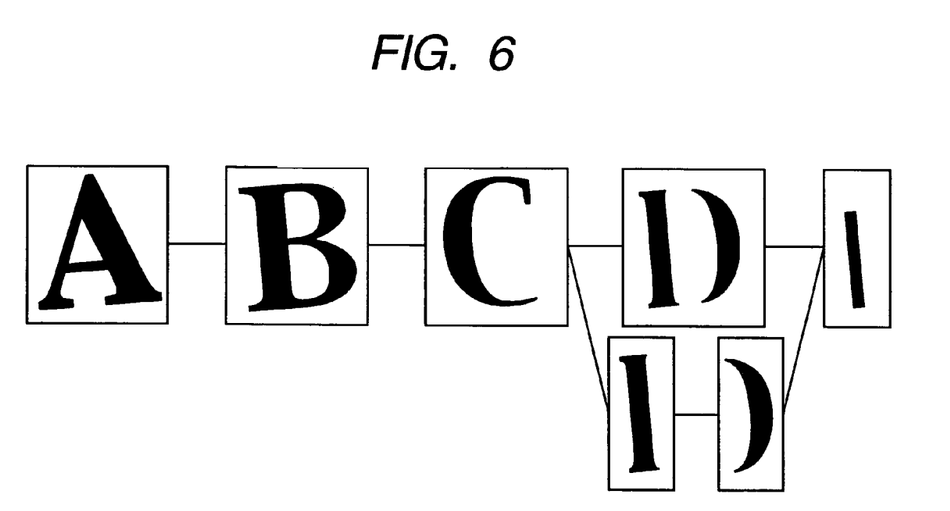
FIG. 6 is a diagram showing an example of the processing performed by a segmentation hypothesis network.

FIG. 6 shows character sub-image candidates resulting from the pre-segmentation in the form of a network. Here, the character sub-image candidates are expressed by nodes (images surrounded by rectangles), and the relationship between adjacent character sub-image candidates is expressed by an edge. Such a network is called a segmentation hypothesis network.

Next, three segmentation hypothesis networks obtained by the pre-segmentation means 104,105, and 106 are synthesized to a single network by means of segmentation hypothesis network synthesis 108. Here, a spatial relationship between character sub-image candidates is analyzed, and character sub-image candidates that are adjacent to each other are linked with an edge, whereby the segmentation hypothesis networks are synthesized. Next, based on the synthesized segmentation hypothesis network, a character string is recognized by character string recognition 109. In that process, each character sub-image candidate is recognized as a character, a candidate most plausible as a character is selected, and selected characters are linked on the network, which is taken out as a character string. At this stage, two or more combinations of character sub-image candidates that are most plausible as a character string may be found. Then, by using information of edges of a text plane obtained by means of text plane detection processing 107, a character string whose layout of the edges is appropriate as a character string is selected by text-plane-edge based candidate-character-string selection 110, and that is designated as a character string recognition result. As another example, a character string recognition result may be selected by comparing plural candidates of character string recognition results obtained by the character string recognition 109 and by making a determination, for example, based on majority rule.

Figure 2:
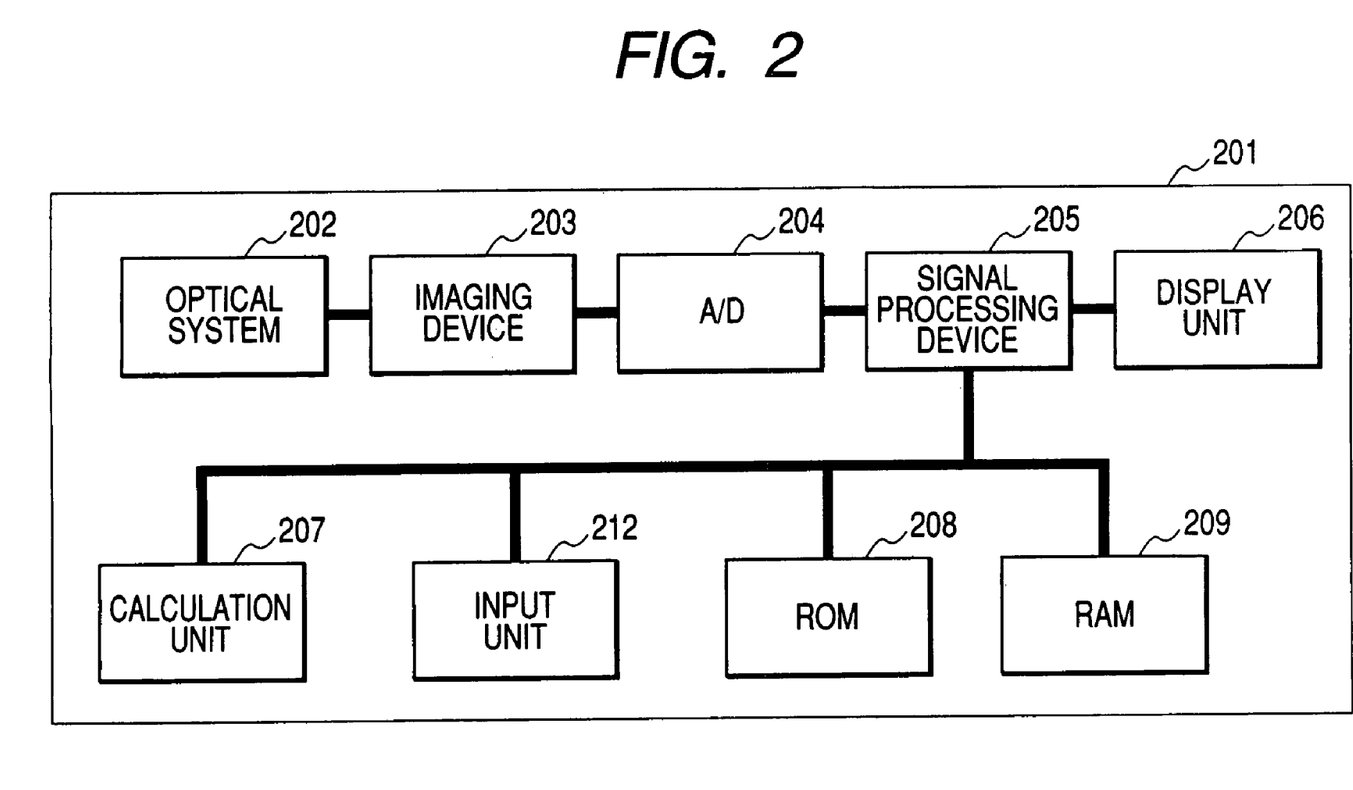
FIG. 2 is a block diagram of an apparatus representing an embodiment of the present invention.

The configuration of the hardware 201 used in this embodiment of invention is shown in FIG. 2. An image is taken by an optical system 202 consisting of a lens, a diaphragm, etc., and the image is subsequently converted into an electric signal by an imaging device 203, such as a CCD device. Further, the obtained electric signal is converted into a digital signal by an analog-to-digital converter 204, and then the digital signal is subjected to several processes of color space conversion, filtering, etc. by a signal processing device 205, such as, for example, a DSP. This result is transferred to a RAM 209. An arithmetic unit 207 performs character string recognition on an image stored in the RAM 209, as an input, by referencing a processing procedure and data necessary for character string recognition, such as a dictionary, that are stored in ROM 208. An input unit 212 is used when manipulating the apparatus. A display unit 206 is used for the purpose of checking an image at the time of taking an image and displaying the recognition result.

Figure 3:
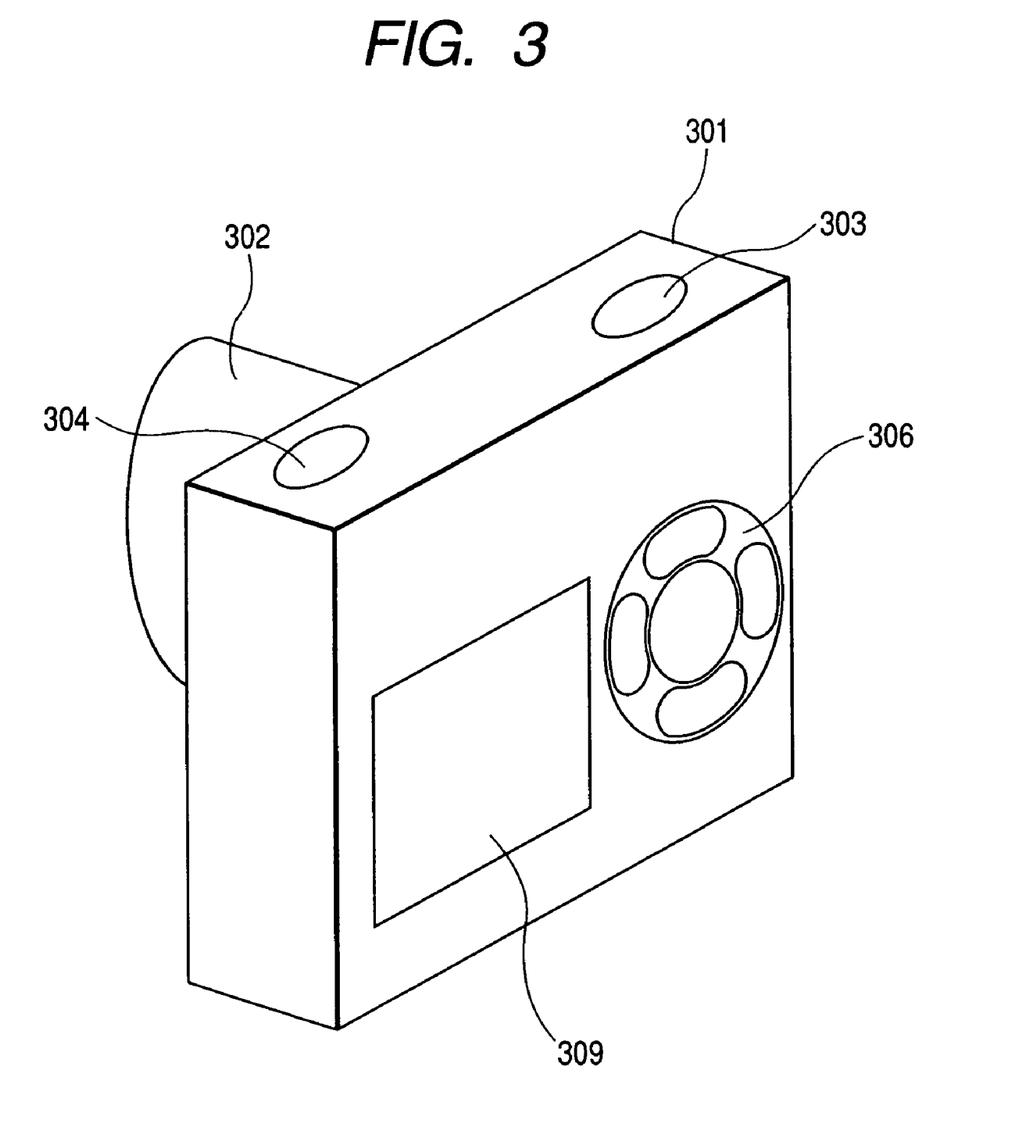
FIG. 3 is a perspective view showing the outer appearance of the apparatus.

FIG. 3 shows an example of the other appearance of the apparatus used in the embodiment of this invention. On the front of an enclosure 301, a lens part 302 of the optical system 202 is disposed. On the top of the enclosure 301, a shutter 303 for directing inputting of an image that, is part of the input unit 212, and a power switch 304 are arranged. On its back, a cursor key 306, that is a part of the input unit 212, is disposed. Moreover, a screen 309 of the display device 206 is disposed on the back. The cursor key 406 sends a signal indicating a direction to the input unit 212 when an upper, lower, left, or right end thereof is pressed, and it sends another signal to the input unit 212 when the center thereof is pressed. Note that FIG. 2 and FIG. 3 show a configuration block diagram and an appearance perspective view of the apparatus, respectively, and a configuration in which this apparatus is integrated with a portable telephone etc. is also feasible. The processing shown in FIG. 1 can be implemented with software that works in the arithmetic unit 207 in FIG. 2. However, the operation of the software can be implemented in dedicated hardware.

Figure 4:
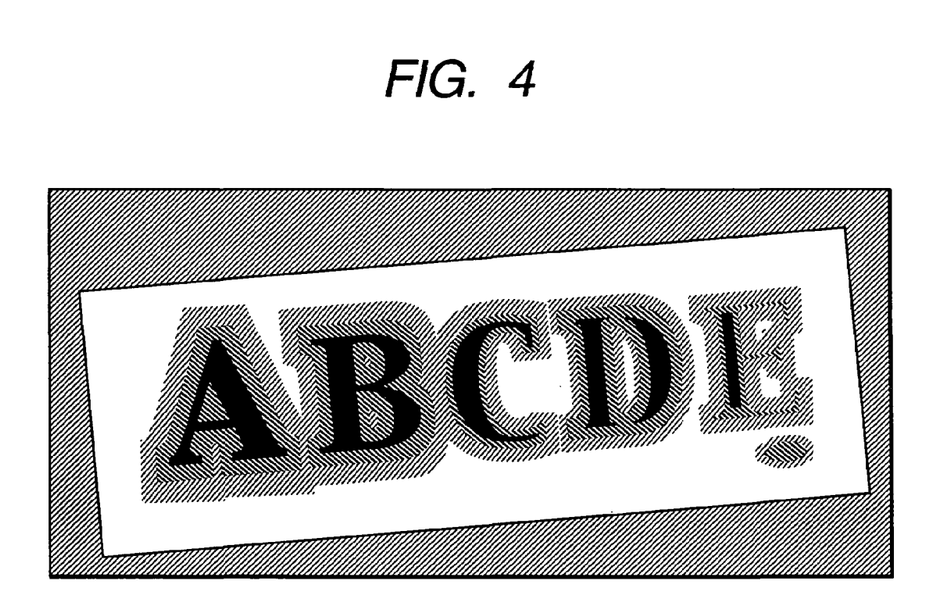
FIG. 4 is a diagram showing an input image.

FIG. 4 shows an example of the input image employed in the embodiment in FIG. 1. The five characters "ABCDE" that appear on a rectangular signboard constitutes this image, which appears to slant to the left. In this picture, illumination becomes darker when approaching the left side. Moreover, an area just under the character "E" located at the right end of the signboard is assumed to be stained black. In the embodiment of FIG. 1, the binarization means 101, 102, and 103 perform their operations with thresholding. The threshold processing is a process in which, when the brightness of a pixel is equal to or more than a threshold value, the pixel value is overwritten with a new pixel value of unity; otherwise, the pixel value is overwritten with zero, this being carried out for all of the pixels. As a measure of the brightness of a pixel, in the case of a multi-level input image, a pixel value shall be used; while, in the case of a color input image, a Y-value shall be used. With this setting, various binarization results can be obtained with different thresholds. The binarization means 101, 102, and 103 shall use different thresholds, respectively.

Figure 5A:
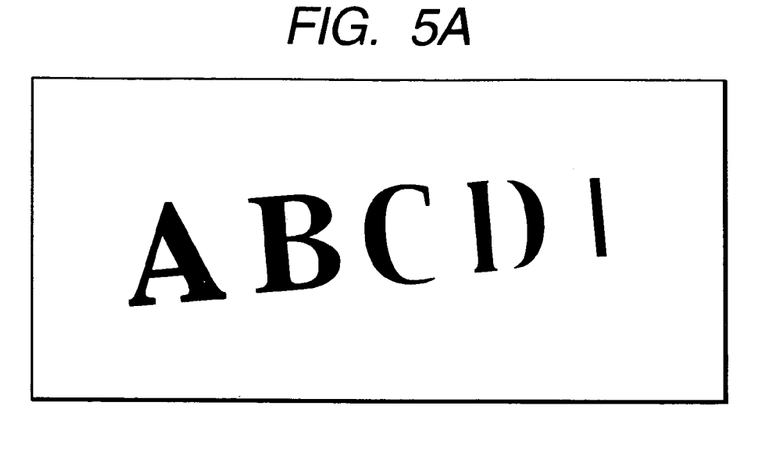
FIG. 5A is a diagram showing a binarization result with a threshold.
Figure 5B:
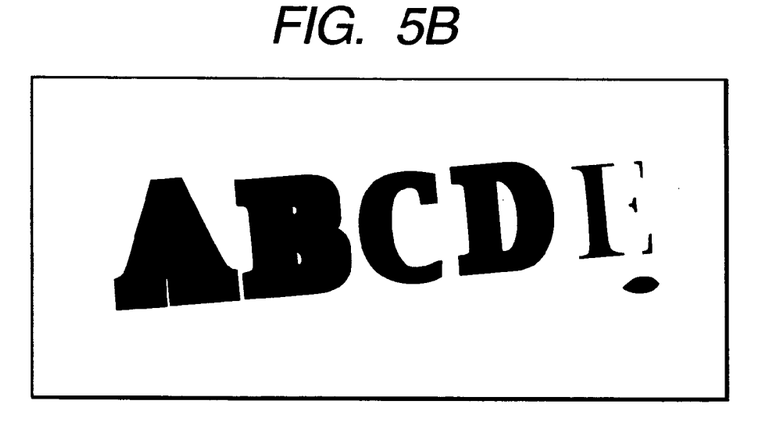
FIG. 5B is a diagram showing a binarization result with another threshold.
Figure 5C:
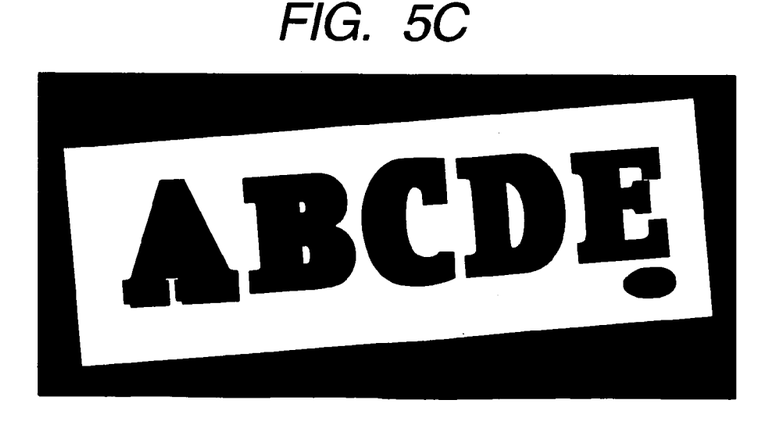
FIG. 5C is a diagram showing a binarization result with still another threshold.

FIGS. 5A, 5B, and 5C show the results of binarization of the image in FIG. 4 by the binarization means 101,102, and 103 having different thresholds, respectively. In this example, since the illumination is uneven, not all of the characters are converted to binary characters properly in any of the binary images.

FIG. 6 shows a character segmentation hypothesis network that is obtained by the pre-segmentation 104 based on the binarization result in FIG. 5A obtained by the binarization means 101. This segmentation hypothesis network expresses results of various character sub-image candidates detected on the basis of various hypotheses of how the image is segmented into characters. However, since the binarization was improper, the "E" was not segmented correctly.

Figure 7:
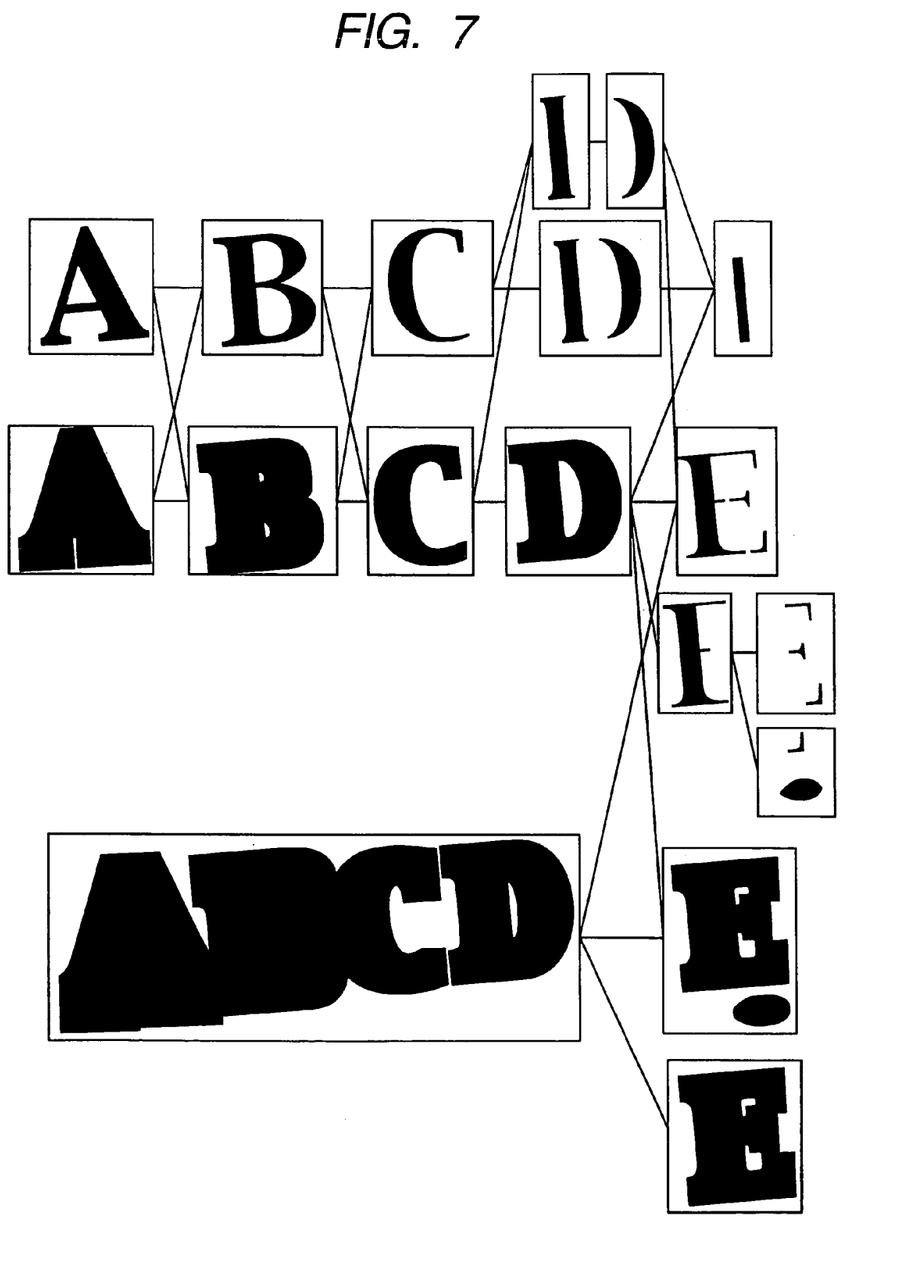
FIG. 7 is a diagram showing the processing performed by the segmentation hypothesis network after synthesis.

FIG. 7 shows a new segmentation hypothesis network obtained by means of the segmentation hypothesis network synthesis 108. This is a new hypothesis network that is created by synthesizing the results obtained by the pre-segmentation 104, 105, and 106. Here, the locations of the character sub-image candidates in each of the segmentation hypothesis networks that were obtained by the pre-segmentation 104, 105, and 106 are analyzed, and the character sub-image candidates that are adjacent to each other are linked with a new edge. For example, an x-axis is set in a horizontal direction and character sub-image candidates whose x-coordinates indicate that the two candidates are adjacent are linked with an edge. Logically, if the number of binarization means is made sufficiently large, this synthesized segmentation hypothesis network includes a correct way to achieve segmentation for all of the characters. Therefore, if a proper path is found on this network, it will correspond to a character string.

The character string recognition 109 recognizes a character string by a method described in a paper by M. Koga and T. Kagehiro, H. Sako, and H. Fujisawa, entitled "Segmentation of Japanese Handwritten Characters Using Peripheral Feature Analysis," in Proc. of the 14th Intl. Conf. on Pattern Recognition, pp. 1137-1141, Brisbane, Australia, August 1998. That is, character sub-image candidates are recognized as characters, and a string of character sub-image candidates that is most plausible as a character string is searched for on the character sub-image candidate network as a path.

Figure 8:
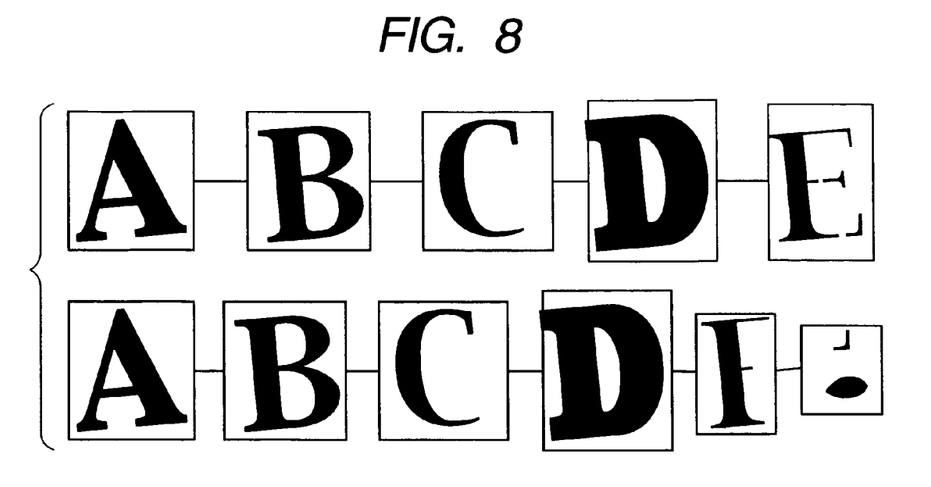
FIG. 8 is a diagram showing candidates of a character string recognition result.

FIG. 8 shows a result of detection of a string of character sub-image candidates, each of which is most plausible as a character, by the means of the character string recognition 109. For example, by performing pattern matching on a character sub-image candidate with a character dictionary prepared in advance, a plausible character sub-image candidate can be extracted. As shown in FIG. 8, there may be a case where plural strings of character sub-image candidates, each of which is plausible as a character string, are detected by the character string recognition 109. Then, referring to the edges of he text plane and using the layout of characters, a most plausible character string as a character string is selected by the text-plane-edge based candidate-character-string selection 110.

Figure 9:
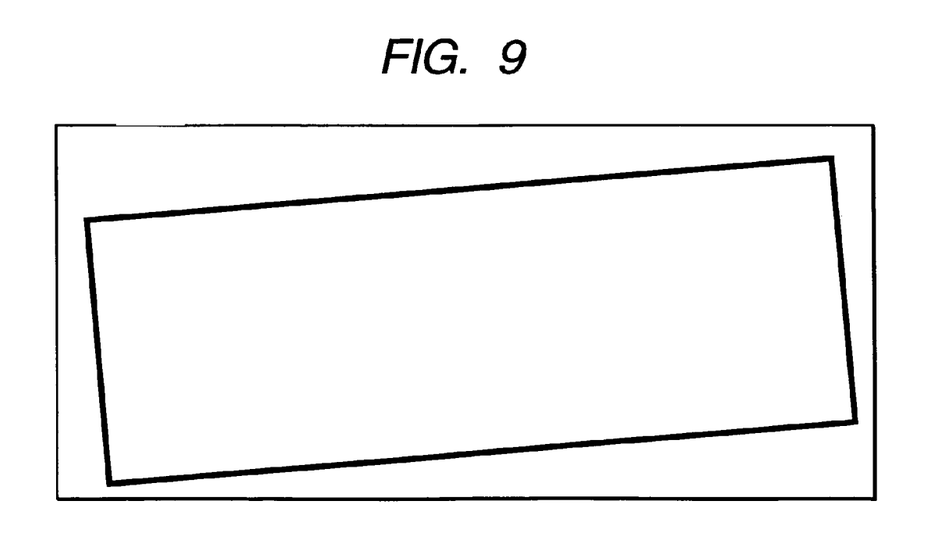
FIG. 9 is a diagram showing a detection result of a text plane.

FIG. 9 shows the text plane obtained by the text plane detection processing 107. To implement the text plane detection processing 107, for example, a method as explained in a paper by P. Clark, H. Mirmehdi, entitled "Locate and recover regions of text in graylevel images of indoor scenes," in Proc. SPIE 2000, pp. 267-277, is used.

Figure 10:
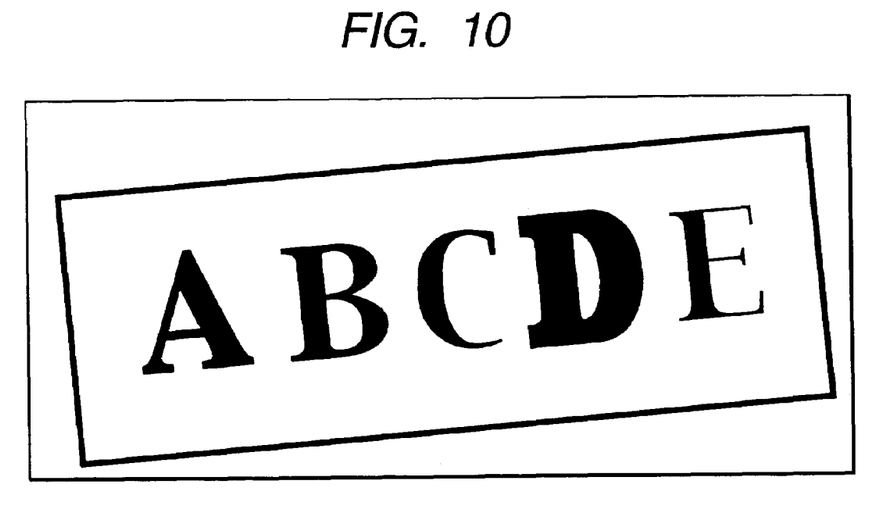
FIG. 10 is a diagram showing a relationship between the character string recognition result and the detection result of a text plane (1)
Figure 11:
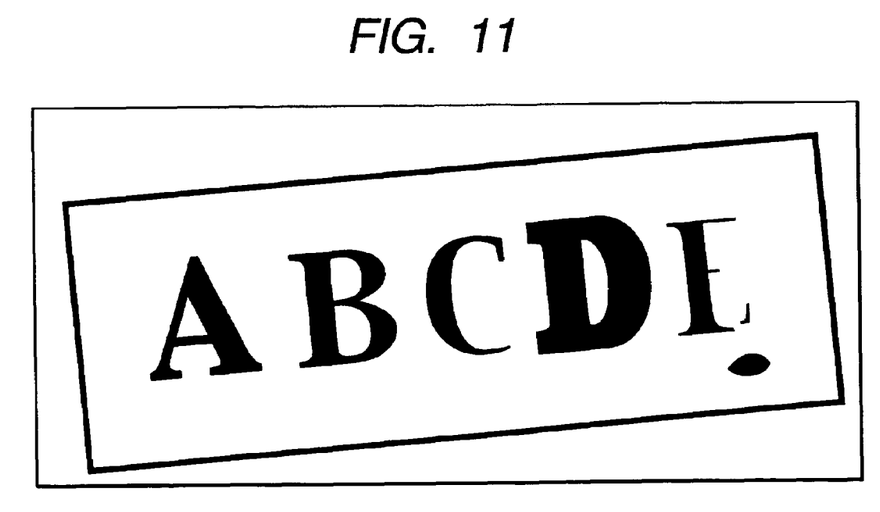
FIG. 11 is a diagram showing the relationship between the character string recognition result and the detection result of the text plane (2).

FIG. 10 and FIG. 11 show two candidates of a character string shown in FIG. 8 superimposed on a frame in FIG. 9, respectively. In this embodiment, as one example of a method for selecting a character string candidate using the character layout, for example, when a difference between the skew of a straight line, which is obtained by a least squares method with respect to centers of gravity of characters, and the skew of the edge of the text plane exceeds a certain value, the character string candidate shall be rejected. Thereby, a candidate as shown in FIG. 11 is rejected, and a character string "ABCDE" can be recognized correctly.

What is claimed is:

1. An apparatus for recognition of a character string in a scene image, comprising:
   a plurality of different binarization means for obtaining a plurality of different binary images from an input image;
   pre-segmentation means for detecting a set of pixels as a set of character subimage candidates from each binary image obtained;
   network synthesizing means for forming a single segmentation hypothesis network from a set of character sub-image candidates obtained by the pre-segmentation means;
   character string recognizing means that selects a set of character subimage candidates that is most plausible as a character from among a set of character subimage candidates of the segmentation hypothesis network, links a set of character subimage candidates on the hypothesis network, and extracts it as a character string;
   text plane detecting means for detecting information of edges of a text plane from the input image; and
   candidate character string selecting means for extracting a character string satisfying predetermined conditions using information of the edges of the text plane when a plurality of character string candidates are extracted as the character string.

\* \* \* \* \*